United States Patent [19]

Parmacek et al.

[11] Patent Number: 4,739,963
[45] Date of Patent: Apr. 26, 1988

[54] ICE MOLDS

[75] Inventors: Robert K. Parmacek, Highland Park; John Joyce; Peter Stryker, both of Naperville, all of Ill.

[73] Assignee: SiLite, Inc., Chicago, Ill.

[21] Appl. No.: 926,138

[22] Filed: Nov. 3, 1986

[51] Int. Cl.⁴ .......................... F25C 1/22; B29C 39/40
[52] U.S. Cl. ........................... 249/61; 206/602; 206/627; 206/634; 215/1 C; 220/4 E; 249/55; 249/82; 249/117
[58] Field of Search ............... 249/55, 61, 82, 127, 249/140, 117; 220/4 E; 215/1 C; 206/602, 617, 627, 634

[56] References Cited

U.S. PATENT DOCUMENTS

| | | | |
|---|---|---|---|
| 1,428,892 | 9/1922 | Latham | 249/82 |
| 2,430,224 | 11/1947 | Green, Jr. et al. | 249/61 |
| 2,618,130 | 11/1952 | Leichtman | 249/78 |
| 2,747,380 | 5/1956 | Ridnour | 249/61 |
| 2,939,299 | 6/1960 | Sherbloom | 249/111 |
| 2,961,844 | 11/1960 | Hitchcock | 62/173 |
| 3,491,907 | 1/1970 | Eelkema | 206/617 |
| 3,771,686 | 11/1973 | Brison | 215/1 C |
| 4,174,782 | 11/1979 | Obsomer | 215/1 C |

FOREIGN PATENT DOCUMENTS 992009  6/1976  Canada ..................... 215/1 C

OTHER PUBLICATIONS

Ice Creations Unlimited—brochure, Denver, Colorado.

Primary Examiner—Jay H. Woo
Assistant Examiner—James C. Housel
Attorney, Agent, or Firm—James N. Videbeck

[57] ABSTRACT

A structural ice mold of the large, single use type, preferably made of FDA approved low density polyethylene plastic, is rotationally molded into a shape forming a hollow cavity on the inside thereof which defines the ice sculpture or figurine to be formed therein. In the improvement of the invention a narrow peripheral ridge or U-shape rib is extended vertically around the outside of the ice mold, preferably at the parting line of the permanent parent mold. The one-piece mold may be opened at the U-shape rib by cutting across the side of the rib at positions away from the surface of the ice figure formed in the mold, rather than by cutting perpendicularly through the mold surface and potentially into the ice figure therein. An additional improvement in ice molds resides in a hollow core formed in the base of the mold which allows for expansion of water in the mold when it changes phase into ice, thereby reducing stress and cracking in the finished ice form.

1 Claim, 2 Drawing Sheets

ICE MOLDS

BACKGROUND OF THE INVENTION

This invention relates generally to plastic ice molds and, more particularly, to disposable, single use, ice molds for making relatively large decorative ice figures.

Heretofore known ice molds have been rotationally molded of food safe plastic to form a cavity into which water is poured and then frozen. In order to free the ice figure from the mold, the sidewall of the one-piece mold is cut or ruptured, most likely by a knife. The knife cuts perpendicularly into the mold sidewall, through the sidewall, and into the ice figure formed therein. The potential for damaging the ice figure while attempting to remove it from the mold is substantial.

Other known molds for making ice objects include U.S. Pat. No. 1,428,892; 2,618,130; 2,939,299; and 2,961,849.

It is therefore an object of the present invention to provide a new and improved ice mold with improved structure thereon for removing the ice figure from the ice mold.

It is an additional object of the present invention to provide an ice mold of more efficient design than heretofore known.

SUMMARY OF THE INVENTION

The invention resides in a mold for forming ice figures which includes a single piece sidewall substantially surrounding a hollow interior portion thereof, an inner surface of the sidewall being contoured to define the shape of a predetermined figure, and a base wall integrally formed with and enclosing a bottom of the sidewall. An aperture or hole at the top of the form is adapted for having liquid poured therethrough into the interior of the mold. The invention resides in an improvement wherein a portion of the sidewall is disposed substantially perpendicularly to an inner surface of the sidewall and is backfolded to define a hollow rib extending over the sidewall at a position where it may be severed to define opposing mold sidewall halves without exposing the interior of the mold other than that rib to any severance means.

Additionally, the invention resides in a large recess on the base wall which extends into the hollow interior of the mold. The recess is deformable to allow for expansion of any fluid positioned in the mold when that fluid freezes.

BRIEF DESCRIPTION OF THE DRAWINGS

The features of the present invention which are believed to be novel are set forth with particularity in the appended claims. This invention, together with further objects and advantages thereof, may best be understood by reference to the following description taken in conjunction with the accompanying sheets of drawings, in the several figures of which like reference numerals identify like elements, and in which:

DETAILED DESCRIPTION OF THE INVENTION

Figure 1:
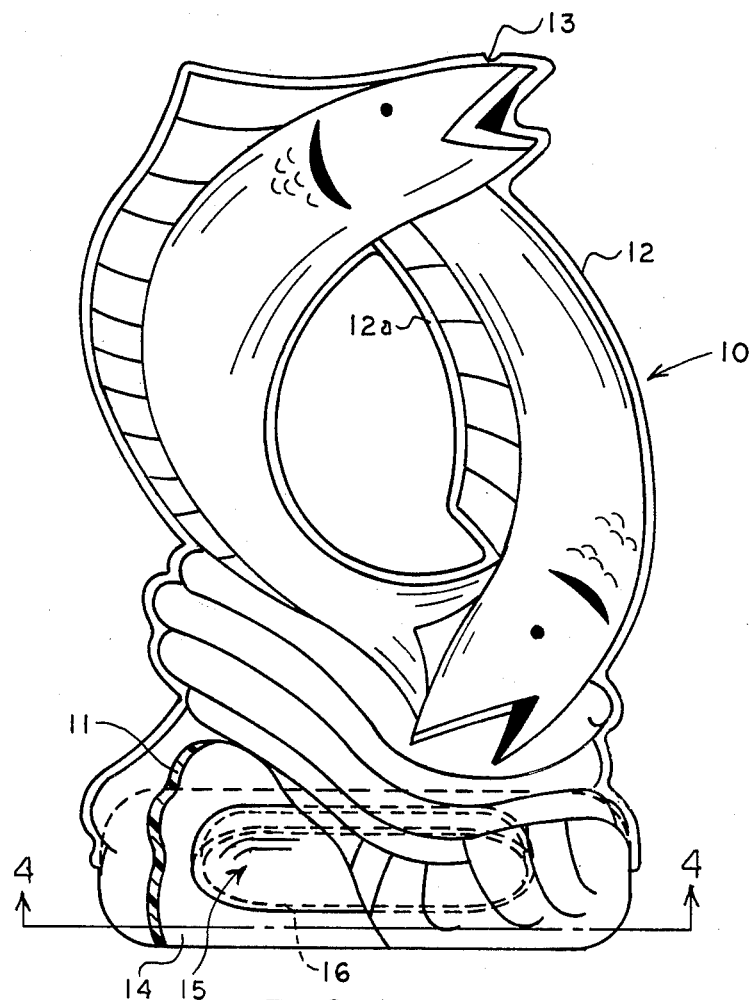
FIG. 1 is a perspective view, with portions cut away and other portions shown in dotted line, of the improved ice mold of the present invention.

Referring to FIG. 1, an ice mold 10 constructed in accordance with the present invention, is preferably made of low density polyethylene plastic. Ice mold 10 is a one piece mold and includes a sidewall 11, formed in the shape of a figure which the final ice structure is to assume, which extends around and defines the outside of the ice mold to create a hollow interior therein into which water is poured and cooled. Preferably, the ice mold is formed by rotationally molding the plastic into the desired hollow shape. In the rotational molding operation, an elongate hollow area is formed in each permanent mold half (not shown) adjacent the parting line of the mold halves so as to form a U-shape rib 12 around the outside of the sidewall 11. Rib 12 has a discontinuity or hole 13 adjacent the top thereof into which water may be poured. Since this mold has a hollow center, a second rib 12a is positioned around that hollow area. It is used similarly to rib 12.

Ice mold 10 further includes a base 14 having an indentation or hollow relieved core, generally indicated at 15, centrally thereon defined by and includes a generally oval ridge 16 which is at the joinder of the base 14 and the vaulted core surface 17 (FIG. 4) which extends upwardly into the hollow interior of the mold 10 as desired. Since water expands approximately 8 percent upon freezing, the relieved volume of the core should be greater than about 8 percent of the interior volume of the mold.

The structure shown in the preferred embodiment 10 of the invention is that of a pair of fish. However, it will be understood that the shape of the ice mold of the present invention is limited solely by the imagination of the mold designer and the ability of the mold to separate from an ice figure formed therein. The present invention facilitates that separation.

Figure 3:
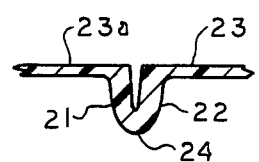
FIG. 3 is a cross section view of the rib of the invention taken substantially along line 3—3 of FIG. 2.
Figure 2:
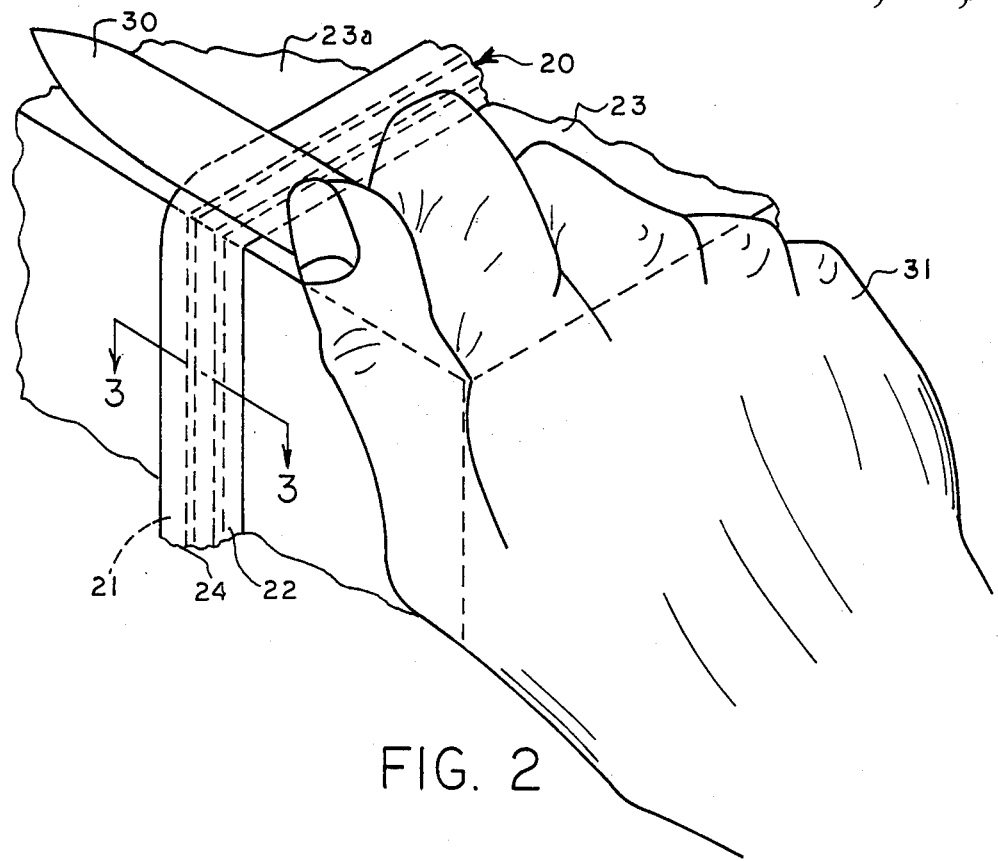
FIG. 2 is a fragmentary perspective view showing the advantages of the mold rib of the present invention when removing the mold from the ice figure therein.

As shown in FIGS. 2 and 3, a U-shape rib, generally indicated at 20, which is similar to rib 12 of FIG. 1, includes a pair of opposed wall members 21, 22 joined at their inner sides to the sidewall portions 23, 23a of the mold and joined together at their distal or outer sides at bight portion 24. Preferably, rib 20 is formed at or adjacent a parting line of the permanent mold (not shown) which is used to form the disposable ice mold 10 of the present invention. However, it will be understood that the rib 20 could be formed at other positions on the mold, for example, if the shape of the mold dictates that it be separated from the ice figure in more than two pieces. The use of rib 20 allows the mold to be made in shapes not heretofore used in one piece disposable molds without the fear of damaging the ice figure while removing it from the mold.

As shown in FIG. 2, one advantage of the rib 12, 20 of the present invention is that once water has been poured and frozen therein, the mold 10 of the present invention may be more easily and safely separated from the ice figure therein without damaging that figure. Previously, the user of a discardable one piece mold would cut the mold away from the ice figure formed therein by using a knife or other cutting instrument and cutting through the plastic sidewall of the mold generally perpendicular to that sidewall. That cutting action exposed the ice figure to the point of the knife which sometimes resulted in damaging the ice figure if the knife was thrust too deeply into the interior of the mold by using too much force, or not withdrawing that force quickly enough when the mold sidewall was penetrated.

With the rib 12, 20 of the present invention, a user may utilize a knife, or other cutting instrument 30 in a cutting position which is substantially parallel to the sidewall 23, 23a of the mold, and is spaced apart therefrom. Knife 30 is shown in FIG. 2 being gripped by a user 31 in the typical cutting position which provides for separation of the mold halves without damage to the ice mold formed thereinside. That typical cutting position is also shown as dotted line A—A in FIG. 2. It should also be noted that the outer portion 24 of rib 20 may be ground away, nibbled away, sawed or otherwise separated into two pieces within the scope of the invention without damaging the surface of the ice figure formed therein. If flashing occurs at rib 20, the flashing may be physically removed or left to melt without damage to the ice figure.

Figure 4:
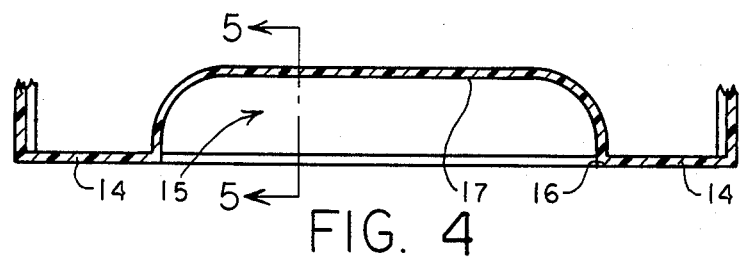
FIG. 4 is a fragmentary cross sectional view taken substantially along line 4—4 of FIG. 1 showing the internal frusto-conical structure of the improved ice mold of the invention.
Figure 5:
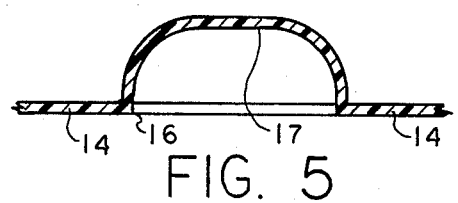
FIG. 5 is a fragmentary cross-sectional view taken substantially along line 5—5 of FIG. 4.

As shown in FIGS. 1, 4, and 5, in another aspect of the present invention a hollow vaulted core structure 15 extends upwardly from the center of base 14 and is formed of the same plastic material as the remainder of the one piece ice mold 10. The lower base portion of a typical ice figure is where the greatest mass of water/ice is concentrated and, therefore, where the last freezing and the greatest expansion will occur. Placement of the hollow expansion core at the center of the base allows the freezing ice in the thinner portions of the mold to freeze first and push the expansion largely to the still liquid center of the base. Freezing in this manner substantially eliminates the number of stress cracks in the ice formed and tends to push out the core rather than the sides of the mold. The ice figure formed in this mold is more structurally sound than that found in one piece molds heretofore known.

While one embodiment of the invention has been shown and described, it will be obvious to those skilled in the art that changes and modifications may be made without departing from the invention in its broader aspects. Therefore, the aim of the appended claims is to cover all such changes and modifications as fall within the true spirit and scope of the present invention.

The invention is claimed as follows:

1. In a one piece disposable mold for forming ice figures, said mold being molded of plastic material and including
    a sidewall portion extending around a hollow interior of said mold and being shaped with an interior surface of said sidewall forming the outline of a figure to be molded of ice, said sidewall portion having a fill opening;
    a base portion extending generally horizontally across and enclosing the bottom of said sidewall portion;
    an improvement comprising
    an elongate narrow raised portion of said sidewall formed along a parting line in any permanent mold in which the same is formed, said raised portion extending from one edge of said base substantially up said sidewall, over a top thereof, and substantially down an opposing portion of said sidewall to an opposing edge of said base, said elongated narrow raised portion providing a zone of destructability for dividing said mold into multiple portions which are removable from any ice figure formed therein without destroying portions of said interior surface of said mold outlining said figure, and
    an indentation recess substantially centrally on said base extending into a hollow interior of said mold for providing a received volume which is greater than about 8 percent of the volume of the ice figure to be formed therein for ice expansion at the interior of said mold.

* * * * *